United States Patent [19]
Kato et al.

[11] Patent Number: 4,694,798
[45] Date of Patent: Sep. 22, 1987

[54] AUTOMOTIVE ENGINE IDLING SPEED CONTROL SYSTEM WITH VARIABLE IDLING SPEED DEPENDING UPON COOLING AIR TEMPERATURE IN AUTOMOTIVE AIR CONDITIONING SYSTEM

[75] Inventors: Masaki Kato, Tokyo; Tsutomu Yamazaki, Atsugi, both of Japan

[73] Assignee: Nissan Motor Company, Limited, Kanagawa, Japan

[21] Appl. No.: 838,817

[22] Filed: Mar. 12, 1986

[30] Foreign Application Priority Data

Mar. 15, 1985 [JP] Japan .................................. 60-50610

[51] Int. Cl.⁴ .......................... F02M 3/00; B60H 1/32

[52] U.S. Cl. ...................................... 123/339; 165/23; 123/585

[58] Field of Search .................. 123/339, 585; 165/23; 62/133

[56] References Cited

U.S. PATENT DOCUMENTS

| | | | |
|---|---|---|---|
| 3,661,131 | 5/1972 | Croft | 123/140 J |
| 4,297,978 | 11/1981 | Matsui | 123/339 |
| 4,345,557 | 8/1982 | Ikeura | 123/339 |
| 4,365,599 | 12/1982 | Ikeura | 123/339 |
| 4,406,262 | 9/1983 | Ikeura | 123/339 |
| 4,422,497 | 12/1983 | Komoda et al. | 123/339 |
| 4,441,471 | 4/1984 | Kratt et al. | 123/339 |
| 4,469,004 | 9/1984 | Manaka et al. | 123/339 |
| 4,479,472 | 10/1984 | Shimamura | 123/339 |
| 4,491,107 | 1/1985 | Haseyawa et al. | 123/339 |
| 4,491,922 | 1/1985 | Kobayashi et al. | 123/339 |
| 4,508,075 | 4/1985 | Takao et al. | 123/339 |
| 4,508,076 | 4/1985 | Oda et al. | 123/339 |
| 4,572,141 | 2/1986 | Haseyawa et al. | 123/339 |
| 4,582,032 | 4/1986 | Hara et al. | 123/339 |

FOREIGN PATENT DOCUMENTS

| | | | |
|---|---|---|---|
| 3401458 | 7/1984 | Fed. Rep. of Germany | 123/339 |
| 2120420 | 11/1983 | United Kingdom | 123/339 |
| 2118743 | 11/1983 | United Kingdom | 123/339 |

OTHER PUBLICATIONS

E. W. Meyer et al., "An Electronic Fuel Control Carburetter System", pp. 67–75.

*Primary Examiner*—Raymond A. Nelli
*Attorney, Agent, or Firm*—Schwartz, Jeffery, Schwaab, Mack, Blumenthal & Evans

[57] ABSTRACT

The idling speed of an internal combustion engine is adjusted in accordance with the required performance of an evaporator of similar air cooler in a vehicular air conditioning system. Sensors monitor engine conditions pertinent to idling speed, including the air temperature at the output of the evaporator. If the evaporator is required to work at peak output, the idling peak is also increases to a maximum. As the load on the evaporator drops, so does the idling speed.

7 Claims, 3 Drawing Figures

AUTOMOTIVE ENGINE IDLING SPEED CONTROL SYSTEM WITH VARIABLE IDLING SPEED DEPENDING UPON COOLING AIR TEMPERATURE IN AUTOMOTIVE AIR CONDITIONING SYSTEM

BACKGROUND OF THE INVENTION

The present invention relates generally to a system and method for controlling the idling speed of an automotive internal combustion engine. More specifically, the invention relates to an idling speed adjustment depending upon the required cooling efficiency of an automotive air conditioning system.

In conventional engine idling control systems, idling speed is derived predominantly on the basis of engine or engine coolant temperature. Various correction parameters have been employed to control the engine idling speed more precisely corresponding to engine conditions. Among such known engine idling speed correction parameters, so-called "idle-up" is performed in response to operation of an automotive air conditioning system in air-conditioning (A/C) mode. In the "idle-up" operation, the engine idling speed is increased by a predetermined value. Conventionally, the increment to the engine idling speed in "idle-up" operation has been a fixed value selected so as to obtain maximum efficiency of a cooled air source, such as an evaporator, in the air conditioning system.

On the other hand, the required cooling efficiency of the air conditioning system varies substantially with environmental conditions of the vehicle, such as atmospheric temperature, humidity, vehicle cabin temperature, desired cabin temperature and so forth. Therefore, it will be appreciated that the maximum cooled air source efficiency is not always required for satisfactory air conditioning and dehumidification. This, in turn, means that the engine idling speed need not necessarily be increased to the fixed speed to achieve maximum efficiency of the cooled air source of the air conditioning system, depending upon environmental conditions.

SUMMARY OF THE INVENTION

Therefore, it is a principle object of the present invention to provide a method and system for controlling engine idling speed depending upon the required efficiency of a cooled air source in an automotive air conditioning system.

Another object of the present invention is to provide a method and system for controlling engine idling speed in an economical manner by avoiding excessively high idling speeds while the air conditioning system is inactive.

In order to accomplish the aforementioned and other objects, a method for controlling engine idling speed according to the present invention includes a step of detecting the efficiency required of a cooled air source. The engine idling speed is adjusted according to the required efficiency of the cooled air source between a given basic idling speed and a predetermined maximum speed.

According to one aspsect of the invention, an idling speed control system for an automotive internal combustion engine associated with an air conditioning system, comprises an engine idling control means including an electrically operated actuator for adjusting an idling speed of the engine, a first sensor monitoring a basic engine idling control parameter and producing a first sensor signal indicative of the basic engine idling control parameter, a second sensor associated with a cool air source in said air conditioning system for monitoring the output air temperature of said cool air source and producing a second sensor signal indicative of the cool air source output temperature, and a controller deriving a basic engine idling speed based on said first sensor signal and deriving a basic control signal indicative of the basic engine idling speed, and said controller deriving a correction value for said basic engine idling speed based on said second sensor signal, which correction value varies with said second sensor signal value, and modifying said basic control signal by said correction value to derive a modified control signal for controlling said actuator so as to adjust the engine idling speed to a speed corresponding to the basic idling speed modified by said correction value.

The second sensor is disposed downstream of said cool air source within an air conditioning passage.

The engine idling control means comprises an auxiliary air control valve disposed within an auxiliary air intake passage of an air induction system of the engine. In the alternative, the engine idling control means is a fuel delivery control lever of a fuel injection pump in a fuel delivery circuit in the engine. In the further alternative, the engine idling control means comprises a pivotable throttle valve.

Acoording to another aspect of the invention, a method for controlling the idling speed for an internal combustion engine for an automotive vehicle which has an air conditioning system powered by the engine, comprises the steps of:

monitoring a first engine idling control parameter;

monitoring the output temperature of a cool air source in said air conditioning system;

deriving a basic idling speed based on said first engine idling control parameter;

deriving a correction value for said basic idling speed based on said output temperature of said cool air source;

modifying said basic idling speed by said correction value to derive a final idling speed; and controlling engine idling speed at said final idling speed.

DESCRIPTION OF THE PREFERRED EMBODIMENT

Figure 1:
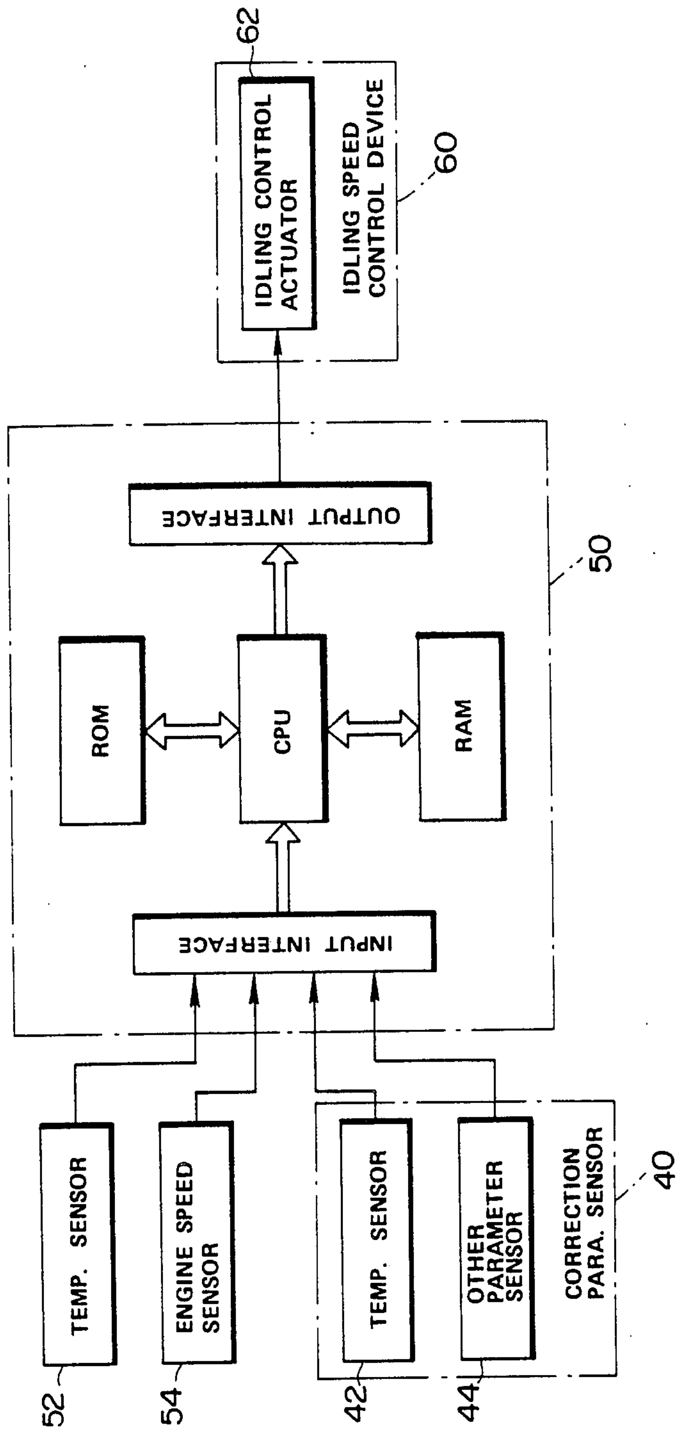
FIG. 1 is a schematic diagram of the preferred embodiment of an automotive engine idling control system according to the present invention.

Referring now to the drawings, particularly to FIG. 1, the preferred embodiment of an automotive engine idling speed control system employs a microprocessor 50 acting as a controller. The microprocessor 50 has per se well known structure including an input interface, CPU, ROM, RAM and output interface. The microprocessor 50 is connected for input from various engine-speed-related parameter sensors 40, 52 and 54 and for output to an engine idling speed controlling device 60 which includes an electrically operable actuator 62.

It should be appreciated that the engine idling speed control device 60 may comprise an auxiliary air control valve in the Otto-cycle internal combustion engine, and a fuel delivery control lever in the case of Diesel engines. Also, the engine idling speed control device may be directly associated with a throttle valve in a primary air intake path of Otto-cycle engines so as to directly control the throttle valve angular position which determines the intake air flow rate in the primaray intake air path. An engine idling control system for controlling the auxiliary air flow rate in Otto-cycle engines has been disclosed in U.S. Pat. No. 3,661,131, to Croft, and U.S. Pat. Nos. 4,345,557 and 4,365,599, both to Kenji IKEURA and assigned to the common assignee to the present invention. Also, the fuel delivery lever control during engine idling in Diesel engines has been disclosed in the German Patent First Publication No. 34 01 458 and assigned to the common assignee to the present invention. The contents of the above-identified publications are herein incorporated by reference for the sake of disclosure.

In the shown embodiment, the sensor 52 monitors an engine or an engine coolant temperature and produces an engine or coolant temperature indicative signal $S_T$. The sensor 54 monitors the revolution speed of the engine and produces an engine speed indicative signal $S_N$. As is well known, the basic engine idling speed is derived on the basis of the engine or engine coolant temperature indicative signal value T. In the recent engine idling speed control systems, CLOSED-LOOP control and OPEN-LOOP control are selectively performed in order to precisely control the engine idling speed depending upon engine conditions. The engine speed indicative sensor signal value N is used in feedback control of the engine speed which attempts to match the actual engine speed, indicated by the engine speed indicative signal, to a set speed which is derived generally on the basis of the engine or coolant temperature.

The sensor 40 serves as a correction parameter sensor and includes one or more sensors. The basic engine idling speed derived based on the engine or engine coolant temperature indicative signal is modified on the basis of the correction parameters monitored by the sensor 40. In recent engine control systems, the engine idling speed is adjusted depending upon various correction factors, such as transmission gear position, i.e. shifts between PARK or NEUTRAL and FORWARD or REVERSE drive gear positions, additions to engine load, such as turning on the air conditioner system, battery voltage and so forth. In general, the engine or coolant temperature dependent basic engine idling speed is set to the lowest possible speed in view of fuel economy and exhaust emissions. Therefore, the engine idling speed is generally increased from a minimum basic engine idling speed, depending upon the correction parameters.

In the disclosure of the present invention, a sensor 42 monitors air temperature around the outlet of an evaporator 21 (shown in FIG. 2) and produces an evaporator output air temperature indicative signal $S_C$ which will be hereafter referred as a "cooled air temperature indicative signal". Since engine idling speed correction factors other than the cooled air temperature are not essential for the subject matter of the present invention, all such correction parameter sensors, if any, other than the cooled air temperature sensor will be represented by "other parameter sensor" in the block 44 in FIGS. 1 and 2.

Based on the engine or engine coolant temperature indicative signal $S_T$, the engine speed indicative signal $S_N$, the cooled air temperature indicative signal $S_C$ and other idling speed control parameters, the microprocessor 50 derives a set engine idling speed. The microprocessor 50 thus derives an idling speed control signal indicative of the derived set idling speed, and feeds the idling speed control signal to the actuator 62 in the engine idling speed control device 60.

The actuator 62 of the engine idling speed control device is responsive to the idling speed control signal from the microprocessor to adjust idling air flow or auxiliary air flow through the air intake system of the engine or to adjust the fuel supply quantity.

Figure 2:
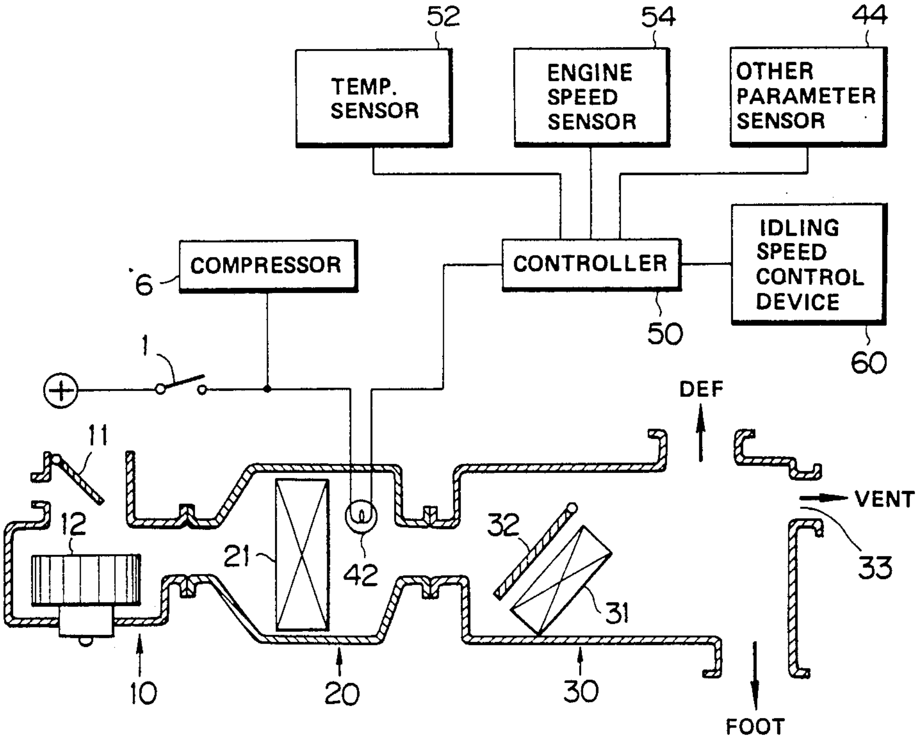
FIG. 2 is a diagrammatical ilustration of an automotive air conditioning system associated with the preferred embodiment of the engine idling speed control system of FIG. 1.

FIG. 2 shows a generic automotive air conditioner system associated with the engine idling speed control system of FIG. 1. The air conditioner system generally comprises an air conditioning path which is divided into a blower section 10, an air cooling section 20 and an air mixing section 30. A blower 12 is disposed within the blower section 10. The blower section 10 is in communication with the atmosphere outside the vehicle through a FRESH AIR inlet and to the vehicle cabin through a RECIRCULATION AIR inlet. An air intake door 11 can pivot between the FRESH AIR inlet and the RECIRCULATION AIR inlet so as to selectively admit external air or internal air into the air conditioning path.

The evaporator 21 is disposed within the air cooling section 20. The evaporator 21 cooperates with a compressor 6 which is coupled with an engine output shaft and driven by the engine. Although not clearly illustrated, an electromagnetically operable clutch is provided at the compressor 6 for connecting and disconnecting the compressor from the engine output shaft. The clutch of the compressor 6 is connected to an air conditioning (A/C) mode selector switch 1. For instance, when the A/C mode selector switch 1 is turned on, the clutch connects the compressor 6 to the engine output shaft to drive the compressor. The evaporator 21 then becomes active to cool the air delivered by the blower section 10.

A heater core 31 is disposed within the air mixing section 30. The heater core 31 accompanies a pivotable air mix door 32 which controls the flow cross-section of the inlet to the heater core 31 depending on the set air condition air temperature. In the air mixing section 30, an air mix chamber 33 is defined downstream of the heater core 31. The cooled air from the evaporator 21 bypassing the heater core 31 and the heated air from the heater core is introduced and mixed to form conditioning air at the set temperature which is then discharged into the vehicle cabin through one or more selected conditioning air outlets, such as a defroster nozzle, a chest vent outlet, a foot vent outlet, etc. The outlet or outlets through which the conditioning air enters the cabin are selected manually.

As set forth above, when the A/C mode selector switch 1 is turned ON and thus the compressor 6 is connected to the engine output shaft, an additional load applied to the engine. Thus, closure of the A/C mode selector switch causes an additional load dependent correction to the engine idling speed. In general, in response to closure of the A/C mode selector switch 1, the engine idling speed derived by the controller 50 is increased by a predetermined extent, which is called "idle-up".

In conventional systems, the basic engine idling speed under normal engine conditions is in the range of 600 r.p.m. to 700 r.p.m. and is increased to approximately 900 r.p.m. during idle-up.

Figure 3:
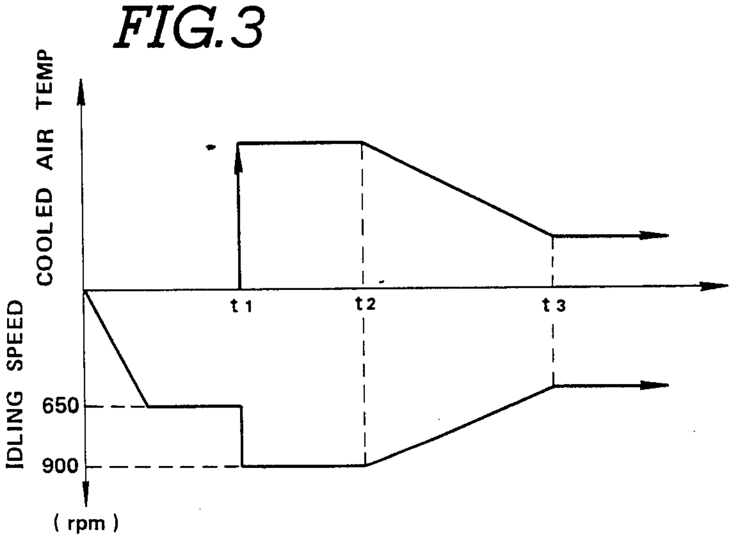
FIG. 3 shows the relationship between evaporator output air temperature and engine idling speed.

It will be appreciated that the required performance of the evaporator 21 will vary significantly under differing environmental conditions. For instance, when the atmospheric temperature is low, maximum performance of the evaporator is not necessary and thus is not necessary to drive the compressor at maximum speed. Furthermore, even at relatively high atmospheric temperatures, the required performance of the evaporator will differ, when starting the evaporator, from when the evaporator has already has been running for a while. Depending upon the driving condition, the cooled air temperature produced by the evaporator 21 will vary in relation to the conditions set forth above. FIG. 3 shows typical variations in the cooled air temperature during successive stages of operation of the evaporator 21.

In FIG. 3, at a time $t_1$, the A/C mode selector switch 1 is turned on and thus the evaporator 21 becomes active. At this initial condition, the internal temperature of the evaporator 21 is relatively high and thus requires higher performance. At this time, the cooled air temperature will be relatively high. The cooled air temperature will remain relatively high until time $t_2$ at which the inside of the evaporator 21 has cooled sufficiently. After the time $t_2$, the cooled air temperature produced by the evaporator 21 drops monotonically until it reaches a minimum temperature at a time $t_3$.

During the period $t_1$-to-$t_2$, the evaporator 21 must exhibit maximum performance to sufficiently cool the introduced air and its own interior as quickly as possible. After $t_2$, the required output of the evaporator drops gradually with the cooled air temperature and reaches a minimum value at the time $t_3$.

In order to monitor the cooled air temperature produced by the evaporator, the cooled air temperature sensor 42 is mounted near the outlet of the evaporator 21. As set forth, the cooled air temperature sensor 42 outputs the cooled air temperature indicative signal $S_C$ to the microprocessor 50. The microprocessor derives a correction value for the basic engine idling speed on the basis of the cooled air temperature indicative signal value, according to the characteristics shown in FIG. 3. As will be appreciated from FIG. 3, during the period $t_1$ to $t_2$ while the maximum performance of the evaporator 21 is required, the idle-up correction value derived on the basis of the cooled air temperature indicative signal value is maximized. As a result, the engine speed is also maximized at, for example, 900 r.p.m. During the period $t_2$ to $t_3$, according to the drop in the cooled air temperature indicative signal value, the idle-up correction value gradually decreases. Accordingly, the engine speed is gradually lowered to the minimum basic idling speed, e.g. 650 r.p.m. When the cooled air temperature reaches the target temperature at $t_3$, the idle-up correction value becomes zero and thus the engine idling speed returns to the basis idling speed.

As will be appreciated herefrom, according to the preferred embodiment, the idle-up correction level varies with the output temperature of the evaporator to avoid unnecessary fuel consumption due to driving the engine at maximum idle-up speed. Furthermore, by maintaining the engine speed at lower speed for longer period, engine noise can be reduced.

Therefore, the invention fulfills all of the objects and advantages sought therefor.

What is claimed is:

1. An idling speed control system for an automotive internal combustion engine associated with an air conditioning system, comprising:

a cool air source in said air conditioning system, said cool air source being driven by said internal combustion engine for producing cool output air;

an engine idling control means including an electrically operated actuator for adjusting an idling speed of the engine;

a first sensor monitoring a basic engine idling control parameter and producing a first sensor signal indicative of the basic engine idling control parameter;

a second sensor associated with said cool air source in said air conditioning system for monitoring the output air temperature of said cool air source and producing a second sensor signal indicative of the air cool source output temperature; and a controller deriving a basic engine idling speed based on said first sensor signal and deriving a basic control signal indicative of the basic engine idling speed, and said controller being responsive to an air conditioning mode selector for deriving a correction value for said basic engine idling speed based on said second sensor signal when air conditioning is selected on said air conditioning mode selector so as to adjust said output air temperature to a given value, which correction value varies with said second sensor signal value from a maximum value when air conditioning is initially selected on said mode selector through a decreasing range to a lower final value as said output air temperature of said cool air source decreases, and modifying said basic control signal by said correction value to derive a modified control signal for controlling said actuator so as to adjust the engine idling speed to a speed corresponding to the basic idling speed modified by said correction value.

2. An idling speed control system as set forth in claim 1, wherein said second sensor is disposed downstream of said cool air source within an air conditioning passage.

3. An idling speed control system as set forth in claim 2, wherein said engine idling control means comprises an auxiliary air control valve disposed within an auxiliary air intake passage of an air induction system of the engine.

4. An idling speed control system as set forth in claim 2, wherein said engine idling control means is a fuel delivery control lever of a fuel injection pump in a fuel delivery circuit in the engine.

5. An idling speed control system as set forth in claim 2, wherein said engine idling control means comprises a pivotable throttle valve.

6. A method for controlling the idling speed of an internal combustion engine of an automotive vehicle which has an air conditioning system powered by the engine, comprising the steps of:

monitoring a first engine idling control parameter;

monitoring the output temperature of a cool air source in said air conditioning system;

deriving a basic idling speed based on said first engine idling control parameter;

deriving a correction value for said basic idling speed based on said output temperature of said cool air source so as to make said output air temperature equal to a given value, which correction value is a maximum initially upon selection of air conditioning on an air conditioning mode selector and then decreases monotonically to a final low value as the output temperature of said cool air source decreases;

modifying said basic idling speed by said correction value to derive a final idling speed; and controlling engine idling speed at said final idling speed such that the output air temperature becomes equal to the given value.

7. An idling speed control system for an automotive internal combustion engine associated with an air conditioning system, comprising:

an air conditioning system having a cool air source driven by said engine;

an engine idling control means including an electrically operated actuator for adjusting an idling speed of the engine;

a first sensor monitoring a basic engine idling control parameter and producing a first sensor signal indicative of the basic engine idling control parameter;

a second sensor associated with said cool air source for monitoring the output air temperature of said cool air source and producing a second sensor signal indicative of the cool air source output temperature; and a controller deriving a basic engine idling speed based on said first sensor signal and deriving a basic control signal indicative of the basic engine idling speed, said controller feedback controlling said idling speed on the basis of said second sensor signal value to maintain said second sensor signal value at a given value which corresponds to desired output air temperature of said cooling air source by deriving a correction value based on said second signal value, said correction value having an initially high value when said air conditioner is initially actuated and having a gradually decreasing value as the temperature of the output air temperature of said cool air source decreases, and modifying said basic control signal using said correction value.

* * * * *